US011456892B1

(12) United States Patent
Uttaro et al.

(10) Patent No.: US 11,456,892 B1
(45) Date of Patent: Sep. 27, 2022

(54) VIRTUAL ROUTER INSTANTIATION ON PUBLIC CLOUDS

(71) Applicant: AT&T Intellectual Property I, L.P., Atlanta, GA (US)

(72) Inventors: James Uttaro, Staten Island, NY (US); Tuan Duong, Eatontown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/202,850

(22) Filed: Mar. 16, 2021

(51) Int. Cl.
*H04L 12/28* (2006.01)
*H04L 12/46* (2006.01)
*H04L 41/0806* (2022.01)

(52) U.S. Cl.
CPC ...... *H04L 12/4633* (2013.01); *H04L 12/4679* (2013.01); *H04L 41/0806* (2013.01)

(58) Field of Classification Search
None
See application file for complete search history.

(56) References Cited

U.S. PATENT DOCUMENTS

| 2016/0352632 | A1* | 12/2016 | Nedeltchev | H04L 12/4633 |
| 2017/0026355 | A1* | 1/2017 | Mathaiyan | H04L 63/08 |
| 2018/0013798 | A1* | 1/2018 | Pallas | H04L 12/4641 |
| 2018/0026933 | A1* | 1/2018 | Asati | H04L 45/12 |
| | | | | 709/223 |
| 2020/0177629 | A1* | 6/2020 | Hooda | H04L 63/1491 |

FOREIGN PATENT DOCUMENTS

WO  WO-2018109536 A1 * 6/2018
WO  WO-2018150222 A1 * 8/2018

* cited by examiner

*Primary Examiner* — Phyllis A Book
(74) *Attorney, Agent, or Firm* — Guntin & Gust, PLC; John G. Rauch

(57) ABSTRACT

Aspects of the subject disclosure may include, for example, instantiating a virtual provider edge router (VPE) of a network operator on a layer 3 public cloud network operated by a cloud operator, establishing a virtual layer 2 bridging domain over the layer 3 public cloud network between a core network of the network operator and the VPE, wherein the virtual layer 2 bridging domain shields infrastructure addressing of the core network of the network operator, and establishing an Interior Gateway Protocol (IGP) of the network operator on top of the virtual layer 2 bridging domain for layer 2 communication between the core network of the network operator and the VPE over the layer 3 public cloud network. Other embodiments are disclosed.

20 Claims, 9 Drawing Sheets

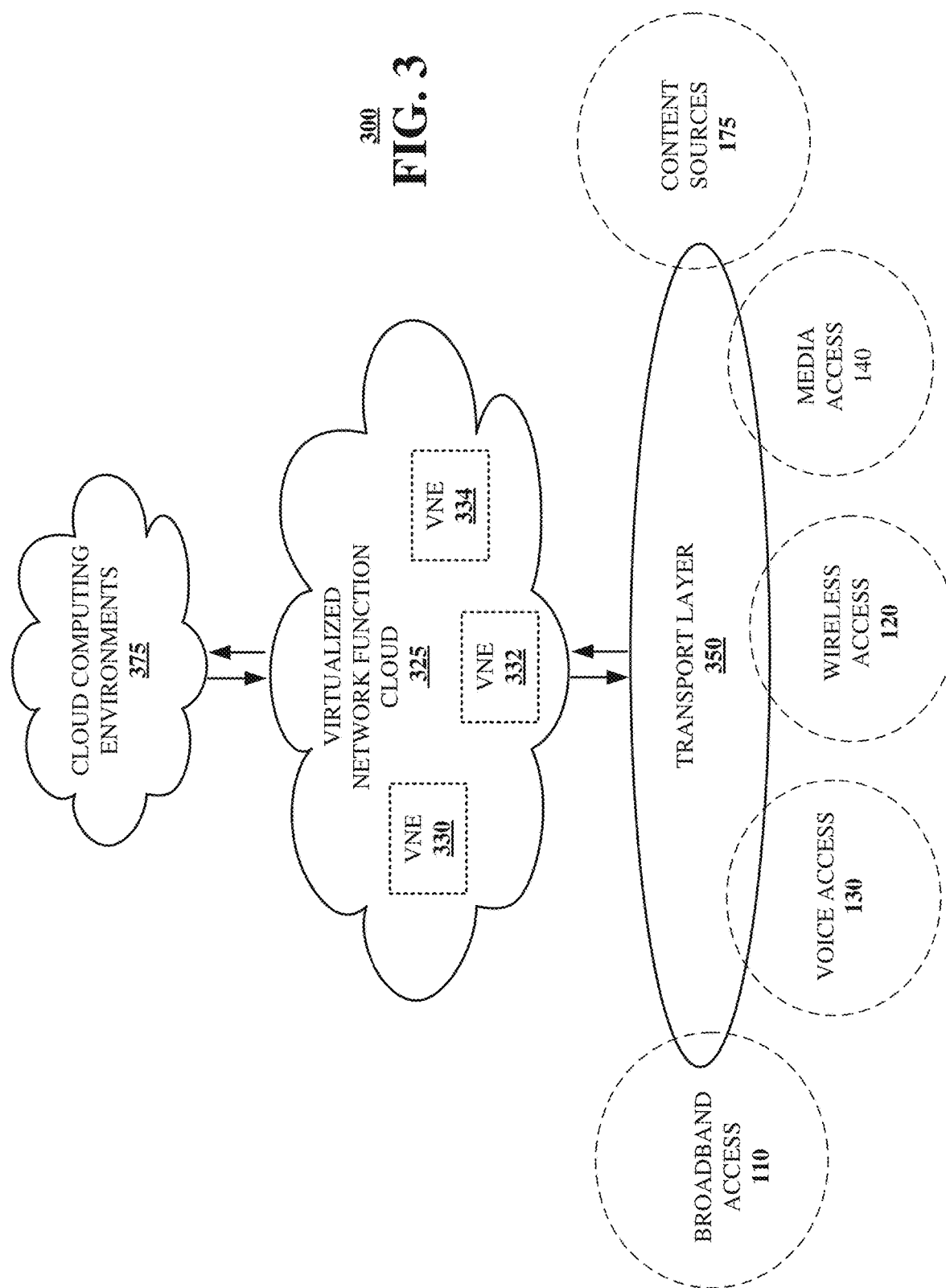

VIRTUAL ROUTER INSTANTIATION ON PUBLIC CLOUDS

FIELD OF THE DISCLOSURE

The subject disclosure relates to instantiation of a virtual router on a public cloud network.

BACKGROUND

Public cloud infrastructure provides an opportunity to virtualize many different appliances, including servers and the functions servers can provide.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for instantiating a router in a public cloud domain such that the router can be used as part of a service provider's network but with opacity for data security and privacy. The subject disclosure further describes virtualizing a provider edge router in a cloud environment. A virtual machine located in a public cloud is provided with router software and operates as a provider edge router in a network of a network operator, to provide network services to customers of the network operator. Other embodiments are described in the subject disclosure.

One or more aspects of the subject disclose instantiating a virtual provider edge router (VPE) on a data processing system of a public cloud network operated by a cloud operator, wherein the public cloud network communicates data according to layer 3 of the Open Systems Interconnection model, establishing a virtual layer 2 bridging domain over the public cloud network between a core network of a network operator and the VPE, and providing network services of the network operator at the VPE, wherein the layer 2 bridging domain shields infrastructure addressing of the core network of the network operator to maintain confidential the data and network of the network operator.

One or more aspects of the subject disclosure include providing instructions and data to a server of a public cloud network operated by a cloud operator, where the instructions and data are operative to instantiate on the server a virtual provider edge router (VPE) of a network provider, wherein the public cloud network communicates layer 3 data according to the OSI model. One or more aspects of the subject disclosure further include extending a layer 2 domain of a core network of the network provider over the public cloud network to the VPE and extending an Interior Gateway Protocol (IGP) of the network provider over the layer 2 domain of the core network to communicate between the core network of the network provider and the VPE as if the VPE is a part of the core network of the network provider.

One or more aspects of the subject disclosure include instantiating a virtual provider edge router (VPE) of a network operator on a layer 3 public cloud network operated by a cloud operator, establishing a virtual layer 2 bridging domain over the layer 3 public cloud network between a core network of the network operator and the VPE, wherein the virtual layer 2 bridging domain shields infrastructure addressing of the core network of the network operator, and establishing an Interior Gateway Protocol (IGP) of the network operator on top of the virtual layer 2 bridging domain for layer 2 communication between the core network of the network operator and the VPE over the layer 3 public cloud network.

Figure 1:
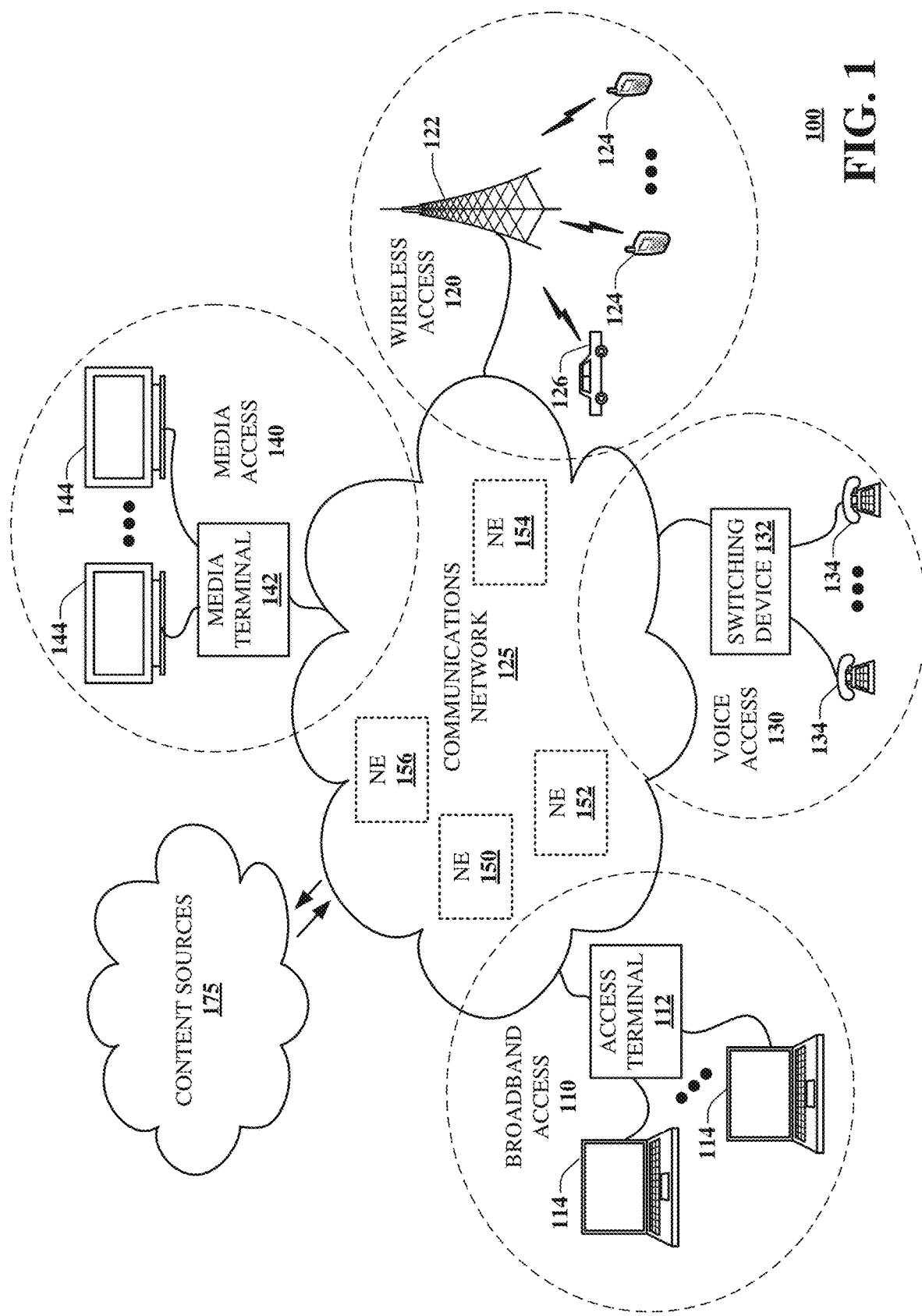
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part instantiating a virtual provider edge router (VPE) on a data processing system of a Layer 3 public cloud network, establishing a virtual Layer 2 bridging domain over the public cloud network between a core network of a network operator and the VPE, and providing network services of the network operator at the VPE. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
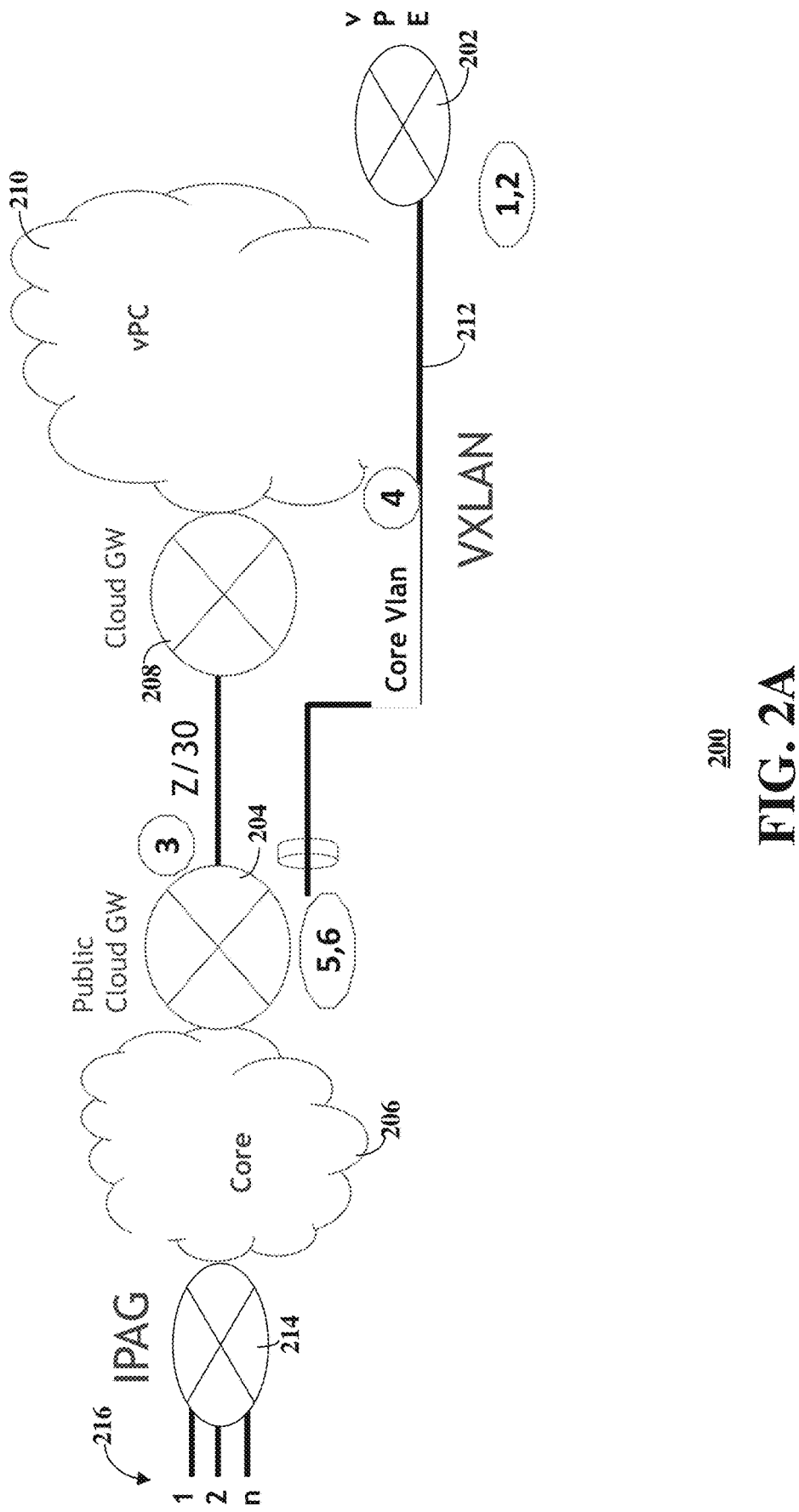
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. Some embodiments herein involve three organizations or actors. A network provider or network operator maintains a core network and provides network services, such as internet access. A cloud provider maintains a public cloud network of routers and similarly provides network services such as software as a service (SaaS) and others. The network provider may be a customer of the cloud provider and locate some virtual facilities, such as an edge router, in the public cloud network. Some embodiments described herein pertain to location of a router of a network provider in the public cloud of the operator. Finally, a customer of the network provider may access the network of the network provider, including the core network, and may access facilities of the network provider instantiated virtually on devices of the cloud provider, such as an edge node.

The system 200 of FIG. 2A may be used to virtualize a provider edge router in a cloud environment. A virtual machine located in a public cloud is provided with router software and operates as a provider edge router in a network operated by a network service provider (also referred to as a network provider or network operator). A provider edge router is a router between one network service provider's area and areas administered by other network providers. The network provider may be an internet service provider (ISP) or provider of other network services and functions such as a wide area network (WAN). The provider edge router may be connected to and in communication with a customer edge (CE) router at a customer premises, where the customer is the network provider who obtains cloud services from the cloud provider. A public cloud may include or involve computing services, including hardware, software and other elements that are offered by a provider, referred to as a cloud provider, over a network such as the internet. Public cloud services are available to any customer who desires to access such services and, if appropriate, pay for such services.

Conventionally, internet protocol (IP) connectivity is the only way that appliances, controllers, etc., can be instantiated on a public cloud. The public cloud uses infrastructure, including routers, servers and other devices, that communicate using IP signaling. Embodiments described herein may utilize an approach that uses a public cloud subnet between a gateway router of a provider of network services, using a virtual router and controllers as an underlay. Further, embodiments described herein may utilize a virtual extensible local area network (VXLAN) bridge domain built on top of the IP infrastructure in the public cloud subnet. In embodiments, the VXLAN bridge domain is stitched to a virtual private LAN service (VPLS) of the provider of network services. Taken together, a bridge domain may be formed across all elements in the WAN and the public cloud. A routing protocol may then be deployed to facilitate IP routing or the bridge domain may be used as-is. Other embodiments are available, as well.

Issues to be addressed by the system 200 include creating reachability from an existing network to the virtual provider edge router that has been instantiated in the cloud in a way that is opaque to the cloud provider and utilizes facilities that the cloud provider currently supports. For example, current cloud providers generally support internet protocol (IP) connectivity to virtual machines and their associated subnets. Current cloud providers are generally unwilling or unable technically to communicate using protocols other than IP with network providers accessing the public cloud. That requires that the network provider must extend its IP infrastructure to the cloud provider so that the network provider can reach the virtual provider edge router. However, that is not desirable for a variety of reasons. For example, the IP infrastructure address space of the network provider may be protected for confidentiality and data security. Further cloud providers provide the address space for customers to use. Cloud customers are not free to use their own addressing.

In an embodiment, a substrate of layer 2 connectivity may be created from the network of the network provider to the virtual provider edge router and on top of the layer 2 substrate, the network provider can run routing protocols for reachability. Layer 2 refers to the data link layer of the Open System Interconnection (OSI) model of computer networking. Layer 2 is the protocol layer that transfers data between nodes on a network segment across the physical layer, referred to as layer 1. Layer 2 data is packaged into frames and layer 2 include error detection and correction. Layer 2 provides functional and procedural means to transfer data between network entities. Ethernet is an example of Layer 2.

In the OSI model, Layer 3 refers to the network layer and is responsible for packet forwarding including routing through intermediate routers. Layer 3 receives frames from Layer 2 and delivers the frames to their intended destinations based on addresses contained inside the frame. Layer 3 uses logical addresses. Internet protocol (IP) is an example of Layer 3.

In an embodiment, to create a layer 2 connection between the network provider and the virtual provider edge router (VPE) of the cloud provider, the network provider can use routed Ethernet. This operates as a layer 3 routing domain and, on top of that, a layer 2 bridging domain is located and on top of that, an Interior Gateway Protocol (IGP) reachability domain is located. IGP is a type of data communication protocol for exchanging routing information between gateways or routers within an autonomous system, such as within a core network operated by a network provider. The routing information can be used to route layer 3 or network-layer protocols like IP. The layer 3 routing domain, plus the layer 2 bridging domain, plus the IGP reachability domain may be referred to as a sandwich for data communication between the core network and the VPE. Use of the layer 2 bridging domain shields or protects or does not expose infrastructure IP addressing of the core network of the network provider to the cloud provider. Further, the use of the layer 2 bridging avoids extending infrastructure IP addressing of the network provider to the cloud provider at an IP level. The embodiment builds an Ethernet layer 2 bridging on top of a layer 3 routing. Once that is established, the embodiment includes IP connectivity between the network provider and the cloud provider, on top of that is a layer 2 bridging and on top of that the network provider extends its IP addressing infrastructure over the layer 2 bridging to the VPE.

One benefit of such an embodiment is that the cloud provider cannot see the IP addressing infrastructure of the network provider. For example, the network provider maintains an IP infrastructure for a core network and other internal networks. The network provider generally does not allow customers and other entities to participate in that IP infrastructure or associated routing protocols. The network provider maintains infrastructure protection so that outside entities cannot penetrate the network. If the cloud provider or another outside entity could participate in the network provider's IGP or IP addressing, then the network provider would have no way of defending against attacks. Thus, data security and confidentiality are maintained by the network provider. Further, some cloud providers do not want knowledge of the network provider's IP infrastructure and IP addressing. For example, the network operator may have a very large address space, but the cloud provider may operate only low-cost devices with limited routing tables. The cloud operator only wants information about its own internal addresses. The cloud operator provides the network operator with an IP address for a virtual machine and little more.

It has been proposed that the network operator do routing with the cloud operator. However, that would require that the cloud operator would have to change the interface offered by the cloud provider to customers such as the network operator, in terms of connectivity. Therefore, embodiments provide a way to meet the cloud provider with the standard interface offered by the cloud provider to customers and not require anything unusual, while maintaining protection for the network infrastructure of the network provider.

In accordance with embodiments described herein, a router may be virtualized and participate in a wide area network (WAN) of a network operator. This allows the WAN operator to expand into the public cloud according to the terms of the cloud operator. This does not require the cloud operator to change a standard operating procedure and business arrangement and technological data communications. No new requirements are placed on the cloud operator.

For a network provider to utilize the public cloud infrastructure to virtualize controllers, a router that is part of the network provider's WAN network must be deployed in the public cloud. A controller may use this router to communicate with elements in the WAN infrastructure that are being managed by the controller. Conventionally, cloud providers only offer IP connectivity in the form of a subnet. In accordance with embodiments described herein, the controller is part of a bridge domain that spans the controller and elements in the WAN infrastructure.

The system 200 of FIG. 2A shows a virtual provider edge router (VPE) 202 instantiated in a public cloud network, including core infrastructure. The system 200 further includes an IP aggregator (IPAG) network 214, a network provider public cloud gateway (GW) 204, a network provider core network 206, a cloud provider cloud gateway (GW) 208 and a network provider virtual public cloud (vPC) 210. The system 200 of FIG. 2A is intended to be exemplary only. Other embodiments may include other devices and other connections to provide similar functionality. The system 200 may be used by a network provider, such as for example, AT&T Corp., to instantiate a VPE in a public cloud network operated by a cloud operator such as for example, Microsoft Corp.

The VPE 202 is a virtual provider edge router. The VPE 202 may provide services such as a layer 3 virtual private network (VPN), layer 2 VPN, internet services to business customers and other customers served by the network provider. The VPE 202 may be responsible for providing different tiers of service in which a customer may pay different fees for different levels of service, such as different data rates or different network services available in the network of the network provider. The VPE generally is a server through which the network provider provides services to businesses and other organizations. The VPE 202 is a virtual machine of the network provider that is located on a hardware server of the cloud infrastructure that is part of the cloud provider network including the cloud provider cloud gateway (GW) 208 and that is spun up and provided with software to turn it into a provider edge router VPE 202 of the network provider virtual public cloud (vPC) 210. The cloud provider owns the server and other hardware; the network provider owns the software instantiation of the VPE 202 on the spun-up virtual machine on that server.

The VPE 202, operating as a provider edge router, needs to be able to communicate with or reach all other provider edge routers in the network. With that reachability, a service can be created. The network provider public cloud gateway 204 operates as a transitive connecting device to connect to a virtual local area network (VLAN) of the network provider core network 206. However, that VLAN is put inside a VXLAN 212 tunnel to transport over the public cloud infrastructure including the cloud provider cloud GW 208 to the VPE 202. The VXLAN 212 provides the connectivity for the VPE 202 and allows the VPE 202 to connect to any router in the network provider core network 206.

The IPAG 214 is a part of the access network of the network provider. Customers including business customers of the network provider can access the core network 206 through the IPAG 214. This may be done by, for example by a customer edge (CE) router of the customer network.

The IPAG 214 and the network provider core network 206 are physical connections including servers or routers and other components in data communication. The cloud provider GW 208 and the network provider virtual public cloud 210 are a virtual IP network. The network provider public cloud GW 204 provides a communication means for the VPE 202 to connect with the physical connections of the network provider core network 206. The network provider public cloud GW 204 translates data from the physical connections of the core network to packets that travel over the IP network of the cloud.

In FIG. 2A, the IPAG 214, the network provider public cloud GW 204, the network provider core network 206, the cloud provider cloud GW 208 and the network provider virtual public cloud 210 form a physical communication network. In embodiments, the system 200 includes a layer 2 substrate or construct or virtual local area network (VLAN) between the network provider public cloud GW 204 and the VPE 202. A VLAN may be any broadcast domain that is partitioned and isolated in a computer network at layer 2. A VLAN applies tags to network frames and handling the tags in networking systems, such as the network provider virtual public cloud 210. This may create the appearance and functionality of network traffic that is physically on a single network, such as through the network provider virtual public cloud 210 but appears to be split or separated from other traffic in the network. The VLAN keeps network applications separate, such as connectivity for the VPE 202, despite being connected to the same physical network of the network provider virtual public cloud 210.

The cloud provider cloud GW 208 provides an address space designated in FIG. 2A as Z/30. The subnet is designated Z and the connectivity between the network provider public cloud GW 204 and the network provider public cloud GW 204 is referenced by 30. The subnet Z is extended all the way to the VPE 202. This creates an IP subnet containing the cloud provider cloud GW 208 and the VPE. This in turn creates IP connectivity or reachability between the VPE 202, the cloud provider cloud GW 208 and the network provider public cloud GW 204. This is achieved through assignment by the cloud provider cloud GW 208 of the address space Z/30 to the network operator.

Subsequently, on top of the assigned Z/30 address space, the system adds a routed Ethernet solution. In the illustrated embodiment, the Ethernet connection is implemented as a virtual extensible local area network VXLAN 212. The VXLAN 212 may be a virtual local area network that is realized over an IP infrastructure. The VXLAN 212 may be referred to as routed Ethernet and is configured as an IP tunnel that creates a VLAN between the network provider public cloud GW 204 and the VPE 202. A VXLAN generally is a network virtualization technology. In some embodiments, a VXLAN uses a VLAN-like encapsulation technique to encapsulate layer 2 Ethernet frames with in UDP datagrams. A VXLAN may be referred to as an overlay because it permits stretching a layer 2 connection over an intervening layer 3 network by encapsulating or tunneling Ethernet frames in a VXLAN packet that includes IP addresses. A VXLAN is a software solution that can use any suitable signaling protocol such as Ethernet VPN (EVPN).

The network provider public cloud GW 204 and the VPE 202 communicate over the VXLAN 212 and form VXLAN tunnel endpoints (VTEP). A VXLAN network identifier (VNI) may be assigned to uniquely identify the VXLAN 212. In an example, the VNI is a 24-bit field. The VNI may be assigned with an association to the Z/30 subnet IP address between the network provider public cloud GW 204 and the cloud provider cloud GW 208. Communications over the VXLAN 212 are not exposed to the cloud operator of the cloud provider cloud GW 208. The VXLAN 212 tunnels over the top of the IP reachability of the cloud provider cloud GW 208. In some embodiments, multiple VPE devices such as VPE 202 can be configured and accessed from the network provider public cloud GW 204 using the VXLAN 212. A respective VNI may be configured for each respective VPE of the VXLAN.

When the respective VNIs have been configured, the core VLAN of the VXLAN are mapped to appropriate elements of the core network 206. Such elements may include a provider router or P-router that functions as a transit router of the core network 206, for example in a multiprotocol label switching (MPLS) implementation, or an aggregation router of the core network 206. Thus, the VXLAN 212 tunnel can be extended to a device inside the core network 206 or by mapping the VPE to a VLAN that will then extent into the core network. In other words, the layer 2 substrate does not need to stop at the network provider public cloud GW 204. The Layer 2 substrate can be extended into the core network 206. The IGP or MPLS can then be run on such an extension of the layer 2 substrate.

Once the VXLAN is initiated, the layer 3 routing protocol is run so that all devices including devices in the core network 206 and the VPE can communicate in a reachability domain using IP addressing of the network provider. IGP/MPLS may be run over the VXLAN 212 and the VPE is assigned a loopback address that is part of the network operator core network 206. The loopback address is one of the IP-assigned pool of addresses of the network operator.

The VXLAN 212 operates as an extension of the network provider core network 206 through the cloud provider data center including the cloud provider cloud GW 208. The network operator can thus initiate interior gateway protocol (IGP) communications at the VPE 202 as if the VPE 202 is part of the network provider core network 206. For example, the network provider can bring up the open shortest path first (OSPF) IGP on the VPE 202. Once the IGP is initiated, the network provider public cloud GW 204 can communicate over layer 3 with the VPE 202. At the same time, neither the network provider public cloud GW 204 nor the VPE 202 can communicate with the cloud provider cloud GW 208 because they do not participate in that IGP domain. Thus, in effect, the VPE is now functionally a part of or an extension of the network provider core network 206.

FIG. 2A illustrates an example of how reachability may be set up for a VPE 202 to communicate with devices of the network provider core network 206. However, a further step is to provide services to customers accessing the VPE 202 through the network provider virtual public cloud 210. Such customers access the IPAG 214 at one or more network interfaces such as interface 216. In FIG. 2A, the customers are designated by numbers 1, 2, . . . n. Each customer wishes to acquire layer 3 VPN services as provided by the network provider. Each respective customer will build a respective pseudo-wire (PW) representing a VLAN for each respective customer through the network provider core network 206 and through the network provider virtual public cloud 210 landing on the VPE 202.

Figure 2B:
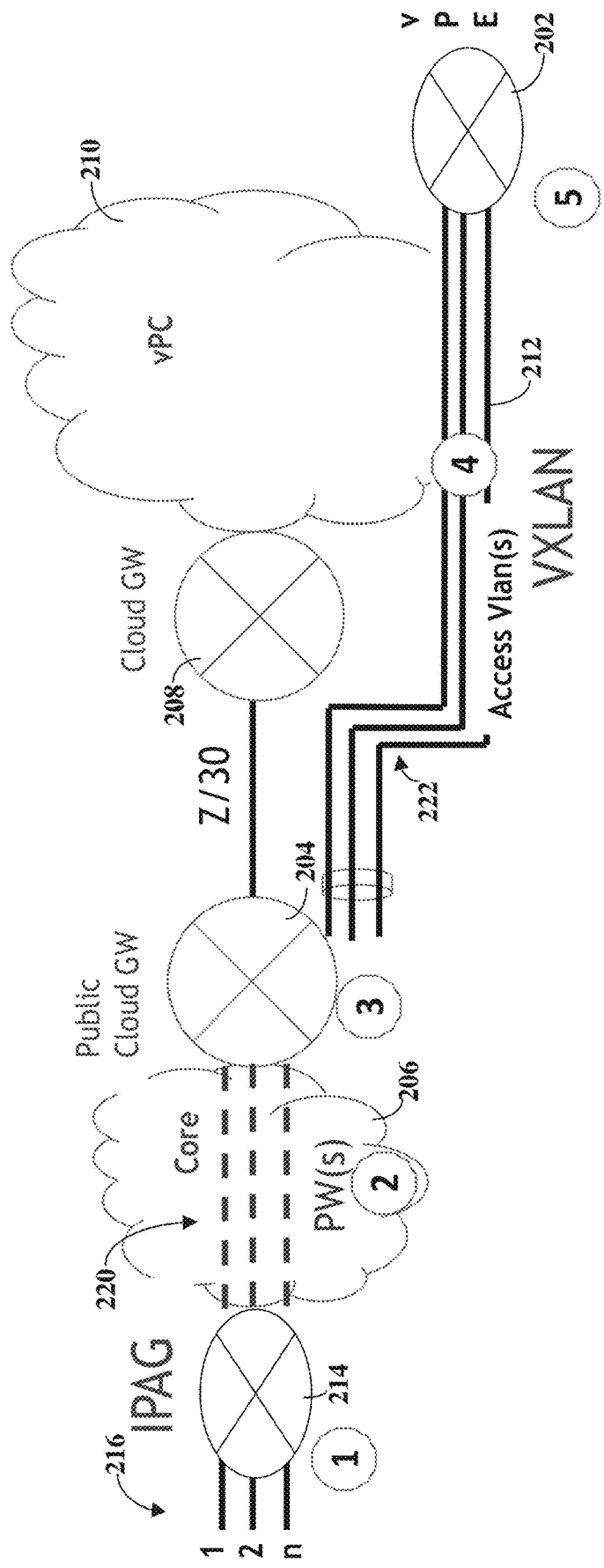
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of the system 200 functioning within the communication network of FIG. 1 in accordance with various aspects described herein. FIG. 2A illustrates how VPE 202 may be instantiated and provided communication access with the network provider core network 206. FIG. 2B illustrates provision of services to customers on the virtualized provider edge router VPE 202 in the network provider virtual public cloud 210.

Customers access the network provider's IP aggregator (IPAG) network 214. This access may be performed, for example, using a customer edge (CE) router. The customers are designated in FIG. 2B as customers 1, 2, . . . n. For each respective customer, a layer 2 pseudo-wire (PW) of one or more pseudo-wires 220 is created through the IPAG network 215 to the network provider public cloud GW 204. A pseudo-wire is an emulation of a point-to-point connection over a packet-switching network. A point-to-point connection is a communications connection between two nodes or endpoints. A packet-switching network communicates data by grouping data into discrete packets and communicating the packets individually between endpoints. The pseudo wires 220 may communicate data according to any suitable communication protocol such as Ethernet or IP. As noted, in the embodiment, the pseudo wires 220 are layer 2 pseudo-wires.

Each respective pseudo-wire 220 is terminated at the network provider public cloud GW 204. Each respective pseudo-wire 220 is further mapped by the network provider public cloud GW 204 to an access VLAN of a plurality of access VLANs 222 of the VXLAN 212. Any suitable mapping, such as a direct mapping, may be used. As noted, the VXLAN 212 can be arranged to include any suitable number of VLAN connections. Each VLAN connection may be a tunnel or pseudo-wire through the cloud network in accordance with the VXLAN 212. Each respective access VLAN 222 is defined by an address and the address of the respective pseudo-wire 220 is mapped to the address of a respective access VLAN 222. The access VLANs 222 encapsulate the layer 2 connection between the public cloud GW 204 and the VPE 202. The respective access VLANs 222 are in communication with the VPE 202 to provide an appropriate service for the customer, such as internet service, VPN service, or other network services.

The system 200 operates to create a layer 2 bridging domain or layer 2 construct over an existing layer 3 or IP scheme between facilities of the network provider and the public cloud. The core network of the network provider is being extended over the layer 2 construct to virtual routers, wherever those routers may be located. Layer 2 or data layer communications from a service provider are being extended into the public cloud. Cloud providers do not conventionally provide such extensions. Cloud providers use IP conventionally and the network provider has core network connectivity. The illustrated embodiments bring those two together, without forcing IP cloud providers to modify their standard operation and signaling.

Figure 2C:
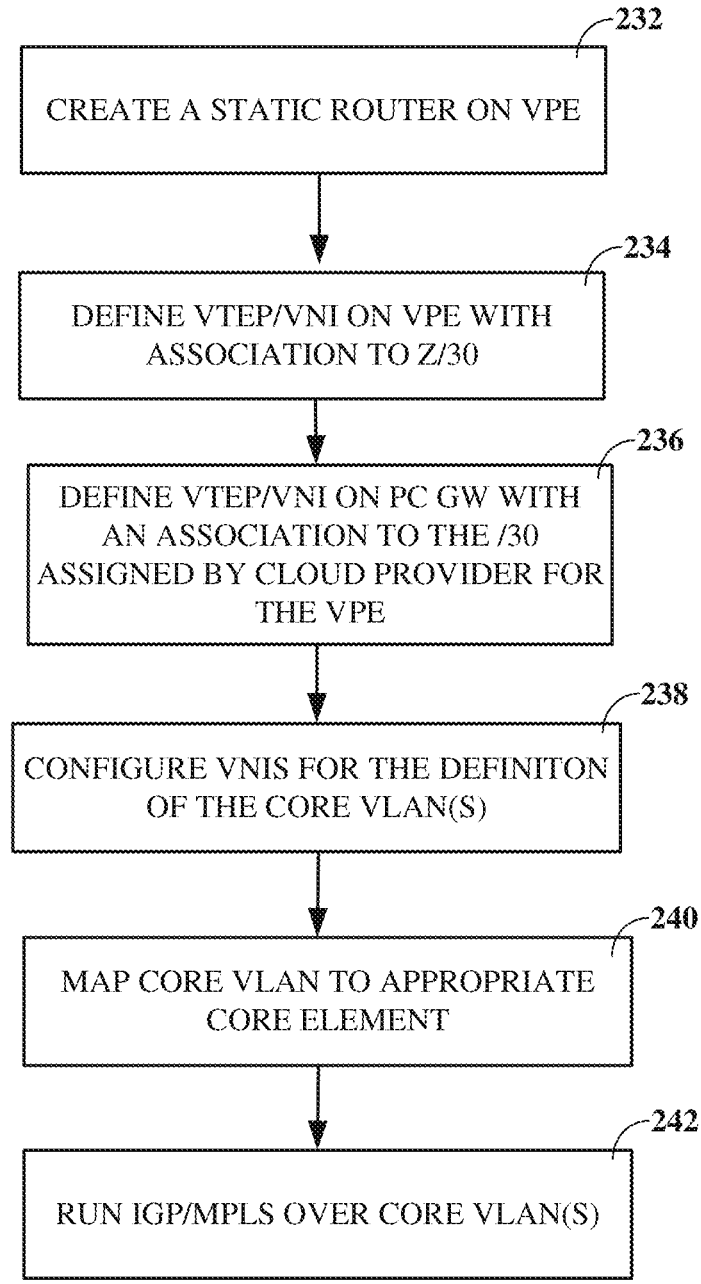
FIG. 2C depicts an illustrative embodiment of a method in accordance with various aspects described herein.

FIG. 2C depicts an illustrative embodiment of a method 230 in accordance with various aspects described herein. FIG. 2C illustrates a method for instantiating a virtual provider edge router (VPE) in a public cloud network. At step 232, a VPE is defined as a virtual device in the public cloud network. The public cloud network may be operated by a cloud network operator such as Azure operated by Microsoft Corp. or Amazon Web Services operated by Amazon.com, Inc. The public cloud network may offer network services on a contract or other basis to business customers. The public cloud network is some embodiments uses internet protocol (IP) connectivity for data communication among components of the public cloud network and with device outside the public cloud network. Customers, such as network providers may access components of the public cloud network for network services and to interact with customers of the network providers.

The operator of the public cloud network establishes policies and procedures, such as data communication standards, for organizations interacting with the public cloud network. For example, the operator of the public cloud network may assign to a customer a predefined address space and one or more subnets to access devices and services of the public cloud network. Customers accessing the public cloud network must adhere to such policies and procedures, such as using IP data communication in the assigned address space. For example, at step 232, the VPE is assigned by the operator of the public cloud network a subnet and address space. In the illustrated embodiments, the subnet is designated as Z and the address space is designated /30.

In some embodiments, a network operator prefers to keep information confidential, including from the public cloud operator. This information may include actual data of the network operator and its customers but also addressing information used in a core network or other network of the network operator. Addressing information, if publicly available, could be used to improperly access the core network of the network operator and corrupt or steal data from the core network. Data security and privacy are important considerations when accessing a public cloud network.

The VPE is established at step 232 as a virtual machine of the network provider. The VPE is located on a hardware server of the cloud infrastructure that is part of the public cloud network including. The VPE is spun up and provided with software by the network operator to turn it into a provider edge router VPE of the network provider virtual public cloud (vPC). The network operator contracts with the operator of the public cloud to obtain and instantiate the VPE.

At step 234, a virtual tunnel endpoint (VTEP) is defined on the VPE. The virtual tunnel may be established as a virtual extensible local area network (VXLAN) and the VTEP is an anchor point for the VXLAN tunnel at the VPE. The VXLAN may use a 24-bit header or address, for example, and the 24-bit header may be referred to as the VXLAN network identifier (VNI) and uniquely identify the VXLAN. The network provider uses the VXLAN for data communication with the VPE.

Similarly, at step 236, a VTEP is defined on a public cloud (PC) gateway (GW) operated by the network provider. The gateway is a server or router or other device established by the network operator at the edge of a network such as a core network of the network operator. The gateway may be designated for interfacing directly with a public cloud such as the public cloud network in which the VPE has been instantiated. The gateway provides and limits access between the public cloud and the core network such as by hiding core network addressing and by providing data encryption and other services. The public cloud gateway communicates directly with components of the public cloud network. The VTEP is defined at the public cloud gateway in association with the Z/30 address space assigned by the operator for the VPE. Thus, the public cloud gateway may perform address translation or other necessary functions to provide data communication between a core network of the network operator (which uses proprietary addressing) and the /30 address space assigned by the cloud operator. Such address translation will communicate data over the public cloud gateway between the core network and the VXLAN to the VPE.

Establishing the VTEP on the VPE and a corresponding VTEP on the public cloud gateway enable the VPE and the public cloud gateway to communicate over the VXLAN. They establish two anchor points for a data tunnel over the public cloud infrastructure between the public cloud gateway and the VPE.

At step 238, the VXLAN may be configured with multiple VNIs. For example, the VPE may be one of multiple VPEs instantiated in the cloud network. Each VPE may be associated with a respective layer 2 subnet. Each respective VPE is then associated with a respective VNI. Each layer 2 subnet is uniquely identified by a VNI that segments traffic.

At step 240, the VXLAN tunnel may be extended to a device within the core network of the network provider by mapping the VXLAN to a virtual local area network (VLAN) that will communicate with the core network. The layer 2 substrate used within the cloud network does not have to stop at the public cloud gateway of the network provider. The layer 2 substrate can extend into the core network of the network provider. Communications according to the network provider's Interior Gateway Protocol (IGP) and multi-protocol label switching (MPLS) protocol are conducted between the core network of the network provider and the VPE. For example, the layer 2 substrate can be mapped to an aggregation router or a provider router (P router) or label-switch router in MPLS.

At step 242, the network provider can run IGP and MPLS the core VLANs. For example, the network provider can run the layer 3 routing protocol so all devices of the core network and the VPE can communicate in the network provider's reachability domain using IP addressing of the core network. The network provider's IGP and MPLS are run over the VXLAN and the VPE is assigned a loopback address that part of the core network.

Figure 2D:
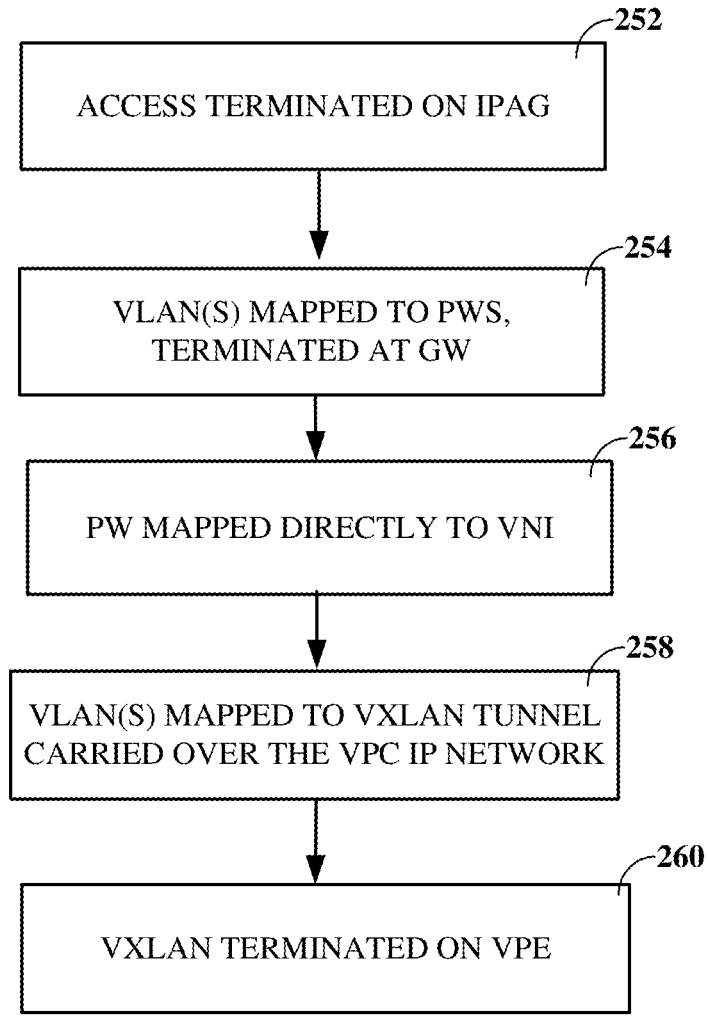
FIG. 2D depicts an illustrative embodiment of a method in accordance with various aspects described herein.

FIG. 2D depicts an illustrative embodiment of a method 250 in accordance with various aspects described herein. FIG. 2C provides an example of how to set up reachability to a VPE in a public cloud network. FIG. 2D illustrates an example of how to provide services to services to customers on the virtualized provider edge router in the public cloud.

At step 252, customers access an IP aggregator (IPAG) network of the network operator. The customers access layer 3 VPN services from the network operator. This may be done by building a series of pseudo-wires, each respective pseudo-wire representing a respective VLAN for each customer. The pseudo-wires extend through the network provider's core network, through the cloud network and land on the VPE instantiated, for example, in the method 230 of FIG. 2C. The pseudo-wire may be a layer 2 pseudo wire extending over the top from the IPAG network to the public cloud. The public cloud gateway of the network provider maps the pseudo-wire to an access VLAN of the VXLAN. The access VLAN is extended to the VPE to provide the appropriate service, such as internet service or VPN service.

In some embodiments, multiple VPE devices are instantiated in the cloud network. Each respective VPE communicates with the core network of the network operator using a respective VLAN of the VXLAN. The VLANs of the VXLAN are terminated at the public cloud gateway of the network provider. Thus, at step 254, one or more VLANs of the VXLAN are mapped to pseudo-wires that extend through the core network. The requisite mapping depends on the hardware and data communication protocols that are used.

At step 258, the one or more VLANs are mapped to the VXLAN tunnel that is carried over the IP network of the public cloud. At step 260, the VXLAN is terminated at the VPE to enable reliable communication over the VXLAN. Other aspects may be developed and implemented to ensure such reliable communication as well.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, 2D, and 3. For example, virtualized communication network 300 can facilitate in whole or in part instantiating a virtual provider edge router (VPE) on a data processing system of a Layer 3 public cloud network, establishing a virtual Layer 2 bridging domain over the public cloud network between a core network of a network operator and the VPE, and providing network services of the network operator at the VPE.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third-party locations.

Figure 4:
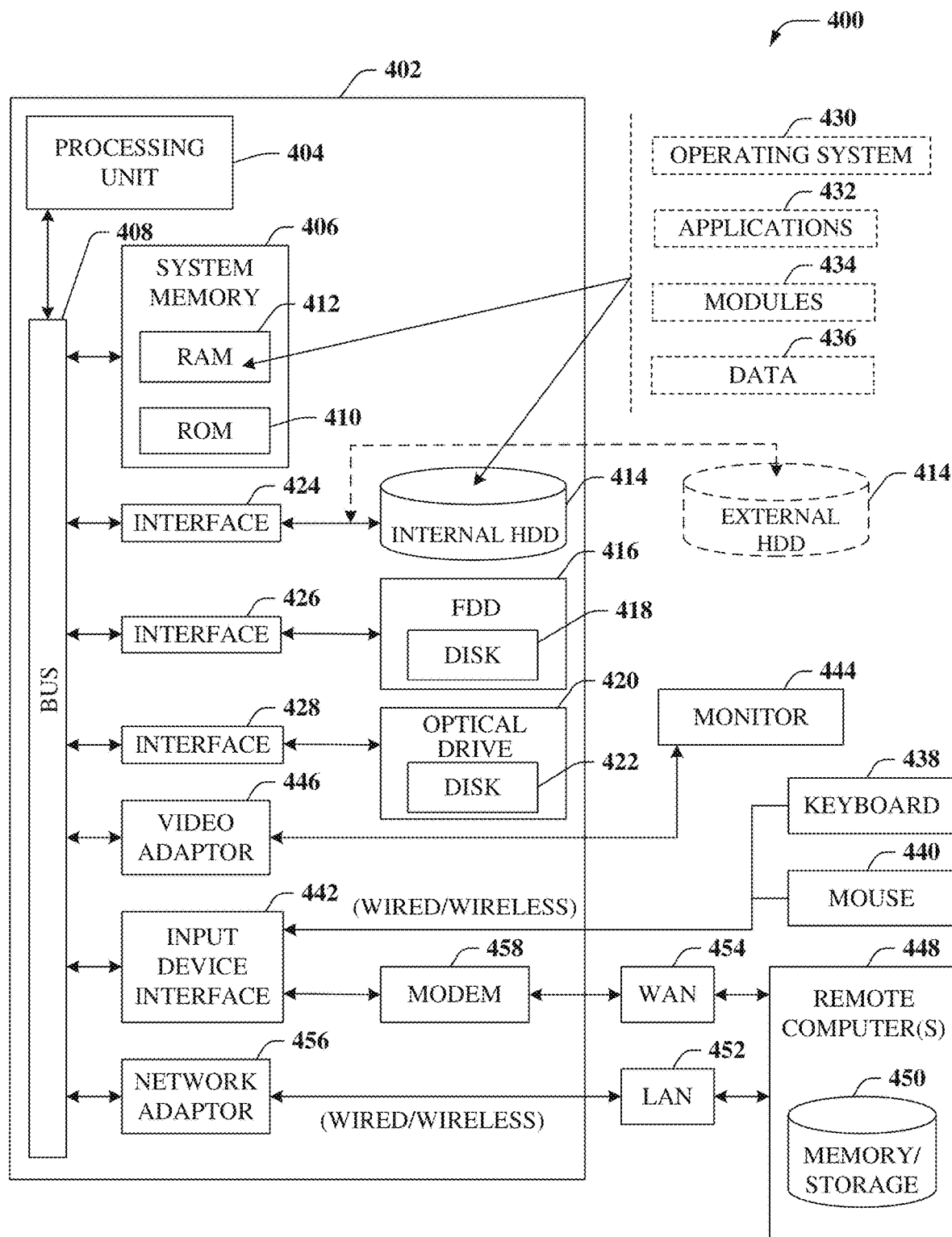
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part instantiating a virtual provider edge router (VPE) on a data processing system, such as is embodied by the computing environment 400 of a Layer 3 public cloud network, establishing a virtual Layer 2 bridging domain over the public cloud network between a core network of a network operator and the VPE.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
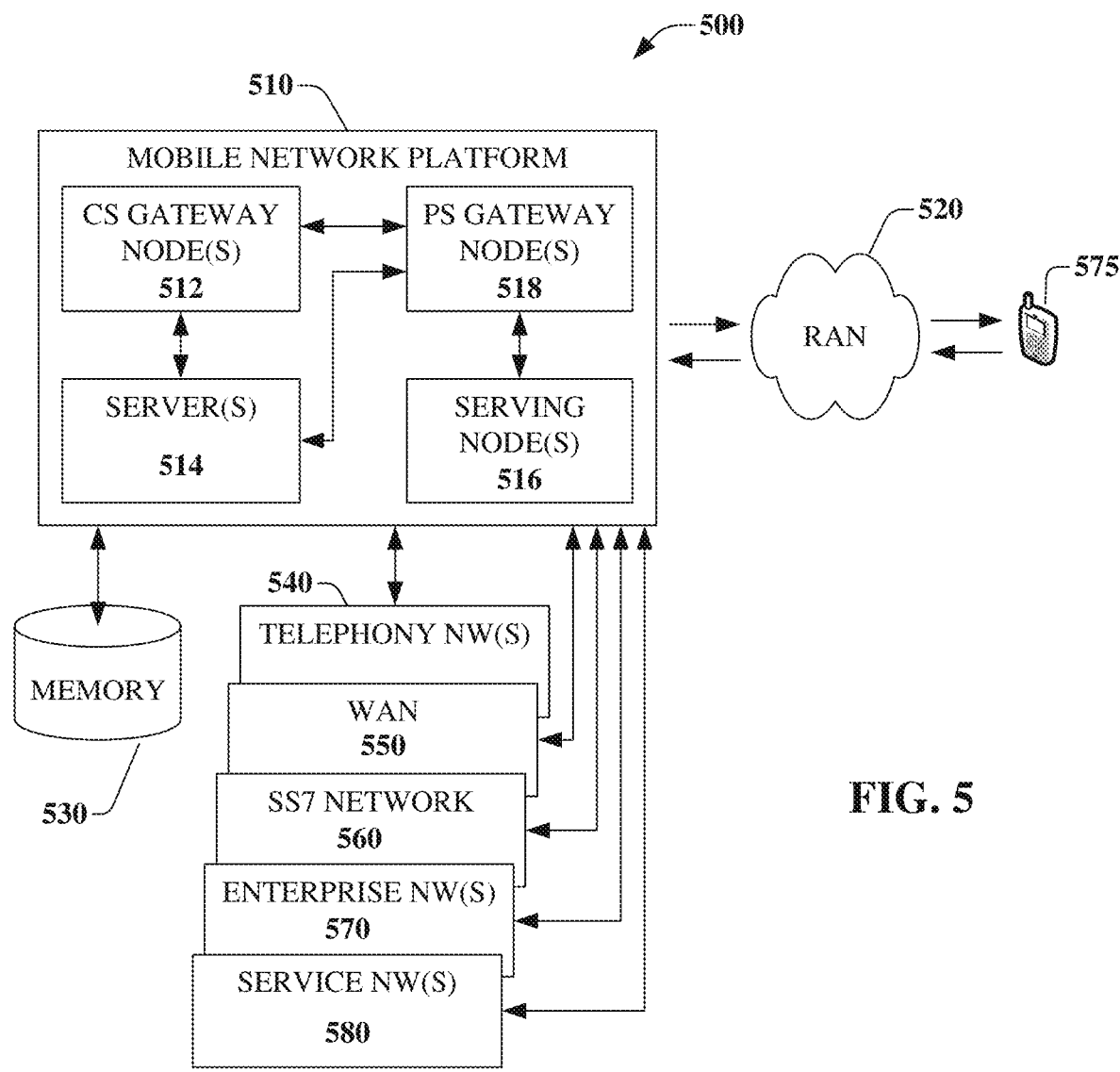
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, mobile network platform 510 can facilitate in whole or in part instantiating a virtual provider edge router (VPE) on a data processing system of a Layer 3 public cloud network, establishing a virtual Layer 2 bridging domain over the public cloud network between a core network of a network operator and the VPE. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
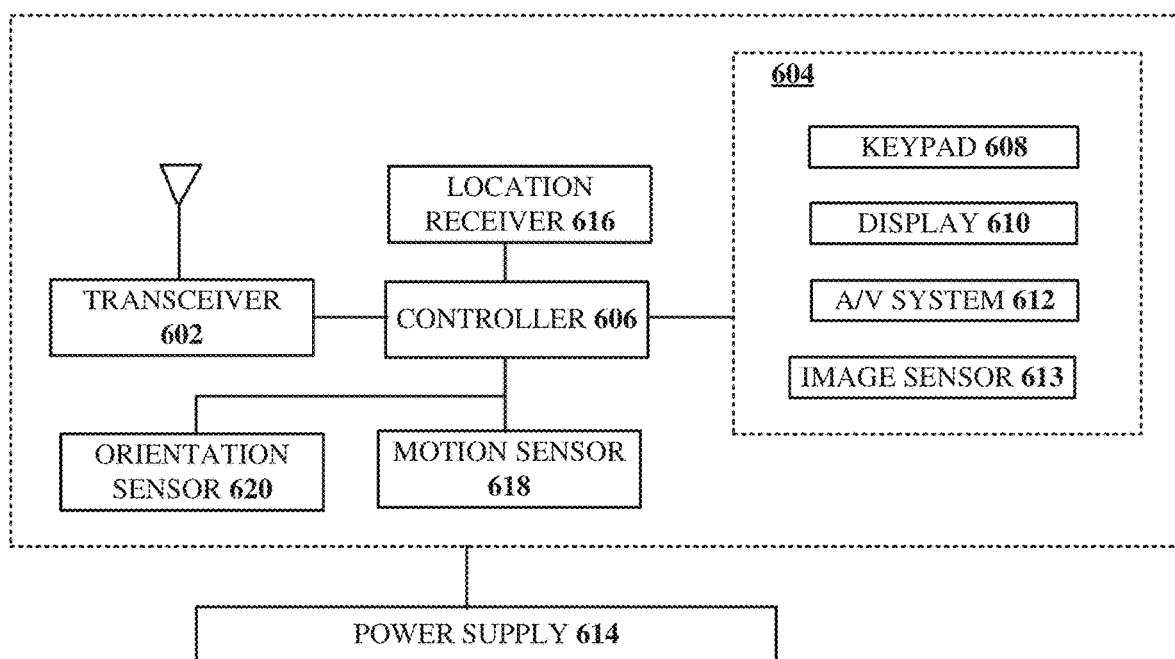
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part instantiating a virtual provider edge router (VPE) on a data processing system of a Layer 3 public cloud network, establishing a virtual Layer 2 bridging domain over the public cloud network between a core network of a network operator and the VPE.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
instantiating a virtual provider edge router (VPE) on a data processing system of a public cloud network operated by a cloud operator, wherein the public cloud network communicates data according to layer 3;
establishing a virtual layer 2 bridging domain over the public cloud network between a core network of a network operator and the VPE; and
providing network services of the network operator at the VPE, wherein the layer 2 bridging domain shields infrastructure addressing of the core network of the network operator.

2. The device of claim 1, wherein the providing network services comprises:
communicating customer data of a customer of the network operator between the VPE and the core network of the network operator over the public cloud network.

3. The device of claim 1, wherein the operations further comprise:
extending layer 2 addressing from the core network of the network operator to the public cloud network without exposing the infrastructure addressing of the core network of the network operator.

4. The device of claim 1, wherein the operations further comprise:
establishing a virtual extensible local area network (VXLAN) between the core network of the network operator and the VPE.

5. The device of claim 4, wherein the operations further comprise:
establishing a network operator public cloud gateway at an edge of the core network of the network operator;
receiving, from the cloud operator, a subnet address space assignment for a subnet assigned to the network operator public cloud gateway;
defining a VXLAN tunnel endpoint (VTEP) at the VPE; and
associating the VTEP at the VPE with the subnet address space assignment.

6. The device of claim 5, wherein the operations further comprise:
defining a second VTEP at the network operator public cloud gateway; and
associating the subnet address space assignment at the second VTEP with the subnet address space assignment.

7. The device of claim 6, wherein the operations further comprise:
establishing a layer 2 pseudo-wire through the core network of the network operator to the network operator public cloud gateway for access by a customer of the network operator;
mapping the layer 2 pseudo-wire to the second VTEP at the network operator public cloud gateway;
mapping a virtual local area network (VLAN) associated with the second VTEP to the VXLAN between the core network of the network operator and the VPE;
terminating the VXLAN on the VPE; and
communicating customer data between the VPE and the core network of the network operator over the VXLAN.

8. The device of claim 1, wherein the operations further comprise:
establishing an interior gateway protocol (IGP) reachability domain on top of the virtual layer 2 bridging domain for communication between the VPE and the core network of the network operator.

9. A non-transitory, machine-readable medium, comprising executable instructions that, when executed by a processing system including a processor, facilitate performance of operations, the operations comprising:
  providing instructions and data to a server of a public cloud network operated by a cloud operator, the instructions and data operative to instantiate on the server a virtual provider edge router (VPE) of a network provider, wherein the public cloud network communicates layer 3 data;
  extending a layer 2 domain of a core network of the network provider over the public cloud network to the VPE; and
  extending an Interior Gateway Protocol (IGP) of the network provider over the layer 2 domain of the core network to communicate between the core network of the network provider and the VPE as if the VPE is a part of the core network of the network provider.

10. The non-transitory, machine-readable medium of claim 9, wherein the operations further comprise:
  establishing a virtual extensible local area network (VXLAN) between the core network of the network provider and the VPE.

11. The non-transitory, machine-readable medium of claim 10, wherein the operations further comprise:
  establishing a network provider public cloud gateway at an edge of the core network of the network provider; and
  defining a VXLAN tunnel endpoint (VTEP) at the VPE for communication between the network provider public cloud gateway and the VPE.

12. The non-transitory, machine-readable medium of claim 11, wherein the operations further comprise:
  defining a second VTEP at the network provider public cloud gateway; and
  associating the VTEP at the VPE and the second VTEP at the network provider public cloud gateway with a subnet address space assigned by the cloud operator.

13. The non-transitory, machine-readable medium of claim 12, wherein the operations further comprise:
  establishing a layer 2 pseudo-wire through the core network of the network provider to the network provider public cloud gateway for access by a customer of the network provider;
  mapping the layer 2 pseudo-wire to the second VTEP at the network provider public cloud gateway;
  mapping a virtual local area network (VLAN) associated with the second VTEP to the VXLAN between the core network of the network provider and the VPE; and
  communicating customer data between the VPE and the core network of the network provider over the VLAN.

14. The non-transitory, machine-readable medium of claim 9, wherein the extending a layer 2 domain of a core network of the network provider over the public cloud network to the VPE comprises establishing a virtual layer 2 bridging domain over the public cloud network to the VPE.

15. The non-transitory, machine-readable medium of claim 14, wherein the virtual layer 2 bridging domain shields infrastructure addressing of the core network of the network provider to maintain confidentiality of the network provider.

16. A method, comprising:
  instantiating, by a processing system including a processor, a virtual provider edge router (VPE) of a network operator on a layer 3 public cloud network operated by a cloud operator;
  establishing, by the processing system, a virtual layer 2 bridging domain over the layer 3 public cloud network between a core network of the network operator and the VPE, wherein the virtual layer 2 bridging domain shields infrastructure addressing of the core network of the network operator; and
  establishing, by the processing system, an Interior Gateway Protocol (IGP) of the network operator on top of the virtual layer 2 bridging domain for layer 2 communication between the core network of the network operator and the VPE over the layer 3 public cloud network.

17. The method of claim 16, comprising:
  providing, by the processing system, network services of the network operator at the VPE for customers of the network operator.

18. The method of claim 17, wherein the establishing a virtual layer 2 bridging domain over the layer 3 public cloud network between the core network of the network operator and the VPE comprises:
  establishing, by the processing system, a virtual extensible local area network (VXLAN) including at least one virtual local area network (VLAN) between the core network of the network operator and the VPE.

19. The method of claim 18, comprising:
  establishing, by the processing system, a layer 2 pseudo-wire through the core network of the network operator; and
  mapping, by the processing system, the layer 2 pseudo-wire to a VXLAN network identifier (VNI) of the at least one VLAN.

20. The method of claim 19, comprising:
  mapping, by the processing system, the at least one VLAN to a core router of the core network of the network operator.

* * * * *